No. 636,410. Patented Nov. 7, 1899.
R. LITTLE.
LUBRICATING DEVICE FOR PISTON OR VALVE RODS, &c.
(Application filed June 8, 1899.)
(No Model.)
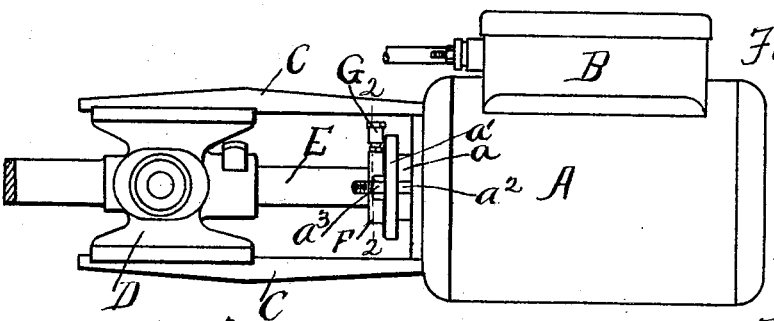
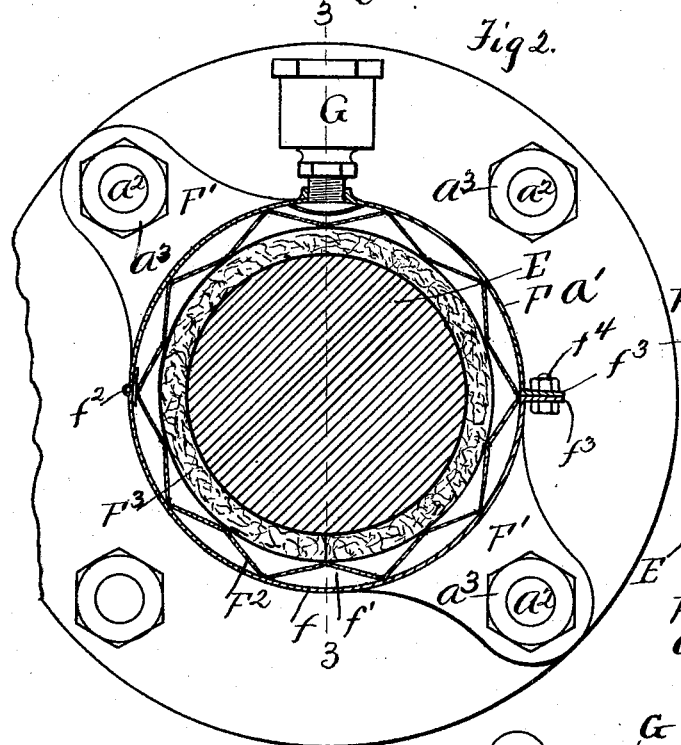
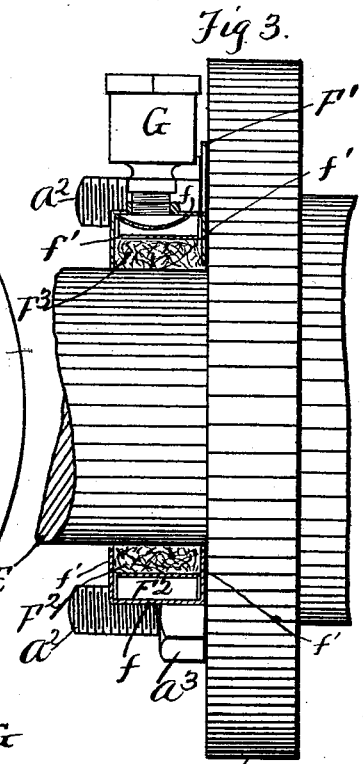
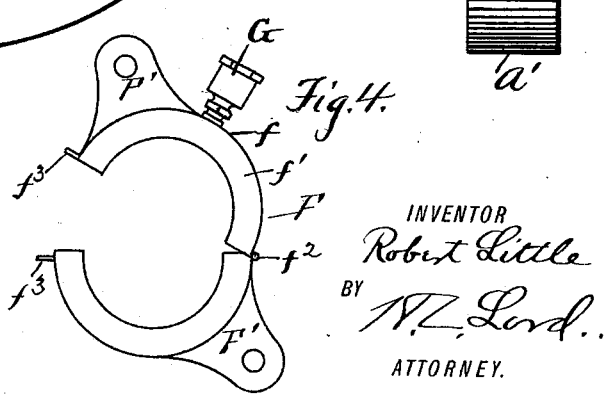
WITNESSES:
INVENTOR
Robert Little
BY
W. L. Lord
ATTORNEY.
THE NORRIS PETERS CO., PHOTO-LITHO., WASHINGTON, D. C.

UNITED STATES PATENT OFFICE.

ROBERT LITTLE, OF ERIE, PENNSYLVANIA.

LUBRICATING DEVICE FOR PISTON OR VALVE RODS, &c.

SPECIFICATION forming part of Letters Patent No. 636,410, dated November 7, 1899.

Application filed June 8, 1899. Serial No. 719,760. (No model.)

*To all whom it may concern:*

Be it known that I, ROBERT LITTLE, a citizen of the United States, residing at Erie, in the county of Erie and State of Pennsylvania, have invented certain new and useful Improvements in Lubricating Devices for Piston or Valve Rods and the Like; and I do hereby declare the following to be a full, clear, and exact description of the invention, such as will enable others skilled in the art to which it appertains to make and use the same.

This invention relates to lubricating devices for piston and valve rods and the like; and it consists in certain improvements in the construction thereof, as will be hereinafter fully described, and pointed out in the claims.

It is desirable to lubricate the piston-rods and valve-rods and rods of similar nature which pass through packing and stuffing boxes in order that the friction on said packing may be decreased, and consequently the life of the packing, as well as the rods, be prolonged. Attempts have been made to carry out this object; but in the common construction the use of such lubricating devices other than the mere dropping of a lubricant upon the rods themselves is attended with so much inconvenience that even though used they are not usually in condition to be efficient.

The object of this invention is to provide a lubricating device of a durable construction which by reason of the convenience with which it can be operated will be maintained with its maximum efficiency.

The invention is illustrated in the accompanying drawings as follows:

Figure 1 shows a side elevation of an engine-cylinder and adjacent parts with my invention in place thereon. Fig. 2 shows a section on the line 2 2 in Fig. 1. Fig. 3 shows the lubricating device in section on the line 3 3 in Fig. 2. Fig. 4 shows the swab-ring of the lubricating device open.

A marks the engine-cylinder; B, the steam-chest; C, the cross-head guides; D, the cross-head; E, the piston-rod.

My invention is shown as applied to a piston-rod.

$a$ marks the gland; $a'$, the follower of the gland; $a^2$, the tightening bolts or studs; $a^3$, the nuts arranged on the studs $a^2$ for operating the follower $a'$. The swab-ring F of the lubricating device is provided with an outer wall $f$ and side flanges $f'$, which form an internal annular groove, in which is placed a lubricating-felt $F^3$. A corrugated strip of spring sheet metal $F^2$ is placed in the annular groove back of the lubricating-felt $F^3$ and presses the lubricating-felt $F^3$ against the piston-rod E and holds the felt in contact with the piston-rod with a slight pressure, thus insuring a proper lubrication of the piston-rod so long as there is oil in the felt, and at the same time the spring takes up any wear which there may on the felt. An oil-cup G is provided in the upper side of the swab-ring and delivers oil to the felt $F^3$. Swab-rings have been provided heretofore for this purpose; but so far as I am aware they have been attached or secured by some means outside of the gland-bolts. With my construction I utilize the gland bolts or studs $a^2$ for securing the swab-ring. To accomplish this, I provide the perforated ears $F'$, which extend from the ring F. The studs $a^2$ are passed through the perforations, and the nut $a^3$, which operates the follower $a'$, also secures a swab-ring. All the constructions of swab-rings with which I am acquainted also are made solid, so that to renew the swab-felt or swab material it has been necessary to disengage the piston-rod from the cross-head. This has been a very laborious undertaking—so much so that after the first application of the swab it is seldom, if ever, renewed, and consequently its efficiency has been limited to the life of the original swab. With my construction I split the swab-ring, so that it can be readily opened sufficiently to introduce a new swab-felt. I also preferably hinge the ring at $f^2$, providing the ears at $f^3$ at the opposite side of the ring. The bolt $f^4$ secures the ring in its closed position. So far as I am aware the only swabs used for this purpose have been formed of a spun fabric made up of numerous strands of yarn. In use these strands become disintegrated at points, and thus loosen a whole strand which has been carried out by the action of the rod. I have found that this may be obviated by using a felted fabric for the swab, preferably such a fabric as is used for the hammers of pianos. This result, as well as perfect lubrication, is better accomplished by a swab-felt formed of a single layer.

What I claim as new is—

1. The combination with a swab-ring having the internal annular groove in which is placed the swab material; the swab material placed in said groove; and a spring formed of corrugated sheet spring metal for pressing it inwardly.

2. The combination with a gland having the follower, $a'$, bolts, $a^2$, and nuts, $a^3$; the piston-rod, E; the swab-ring F, having the perforated ears, F', arranged on the bolts, $a^2$, said swab-ring being formed with the wall, $f$, and side flanges, $f'$, and having the hinge, $f^2$, and fastening devices at the opposite side from said hinge; a swab material within said ring; and a spring, $F^2$, formed of corrugated sheet metal back of said swab material for pressing it inwardly.

In testimony whereof I affix my signature in presence of two witnesses.

ROBERT LITTLE.

Witnesses:
N. J. DUNN,
WM. H. SMITH.